Dec. 23, 1969 L. T. SWENSON ET AL 3,485,312
SNOWMOBILE TREAD DRIVE AND SUSPENSION SYSTEM
Original Filed May 15, 1967 2 Sheets-Sheet 1

INVENTORS
LOWELL T. SWENSON,
ROGER H. SKIME
BY
Schroeder, Siegfried
& Ryan
ATTORNEYS Dec. 23, 1969    L. T. SWENSON ETAL    3,485,312
SNOWMOBILE TREAD DRIVE AND SUSPENSION SYSTEM
Original Filed May 15, 1967    2 Sheets-Sheet 2

INVENTORS
LOWELL T. SWENSON,
ROGER H. SKIME
BY
Schroeder, Siegfried
& Ryan
ATTORNEYS United States Patent Office 3,485,312
Patented Dec. 23, 1969

3,485,312
SNOWMOBILE TREAD DRIVE AND
SUSPENSION SYSTEM
Lowell T. Swenson and Roger H. Skime, Thief River Falls, Minn., assignors to Arctic Enterprises, Inc., Thief River Falls, Minn., a corporation of Minnesota
Continuation of application Ser. No. 638,323, May 15, 1967. This application Apr. 11, 1969, Ser. No. 817,264
Int. Cl. B62m 27/00; B62d 55/14
U.S. Cl. 180—5                                  19 Claims

ABSTRACT OF THE DISCLOSURE

This disclosure is directed to a means of suspending the snowmobile tread from the body or frame structure. A rectangularly-shaped tread frame is supported by a simple lever system connected to the body frame and the rear portion of the snowmobile is entirely supported by the tread mechanism. The tread frame is spring biased against an upward movement towards the body frame and is suspended independently from the driving mechanism of the tread. The tread has a pair of "slit" type openings formed longitudinally in the belt portion to expose the cross cleats on the outside of the tread over which a substantially frictionless shoe rides, the shoe being secured over the bottom of the tread-supporting frame. The spring bias may be changed to compensate for the type of load being carried by the snowmobile.

---

This is a continuation of Ser. No. 638,323 filed May 15, 1967, now abandoned.

This invention relates to the area of snowmobiles and more particularly to the tread drive and suspension mechanism.

A variety of tread suspension systems have been devised for snowmobiles, the more common type mechanism using a number of wheels to support the track or tread, of which Patent 2,925,873 is a good example. In fact, this patent points up the rather complicated structure being used in supporting the track or tread drive mechanism and establishes the need for a more simple and efficient type of structure.

The present invention makes use of a simple lever suspension system in allowing the track and its supporting frame to move upwardly, and slightly to the rear with respect to the body of the snowmobile to form a stable ride. The track suspension mechanism permits the operator to control the spring tension in the spring suspension system and thus compensate the mechanism for a light or heavy load "on-the-spot." The result is that the snowmobile may operate over rough terrain without "bottoming." The structure disclosed herein has relatively few bearings and therefore the problem of bearings burning out or wearing out is reduced to a minimum.

It is therefore a general object of this invention to provide an improvement in snowmobile tread drive and suspension systems.

It is another object of this invention to provide a simple lever suspension system between the tread support mechanism and the body frame.

It is still another object of this invention to provide means for compensating the tread suspension system in accordance with the weight of the load to be carried.

It is yet another object of the present invention to provide a flexible tread structure in which the tread has longitudinal openings therein permitting wear only on the crossbars exposed by the openings.

It is still another object of this invention to provide a tread support structure in which movement of such structure is independent of the driving means.

It is yet another object of this invention to provide a tread support structure having a simple lever suspension system in which a portion of the levers compensate for movement of the other levers.

These and other objects and advantages of the invention will more fully appear from the following description, made in connection with the accompanying drawings, wherein like reference characters refer to the same or similar parts throughout the several views, and in which.

Figure 1:
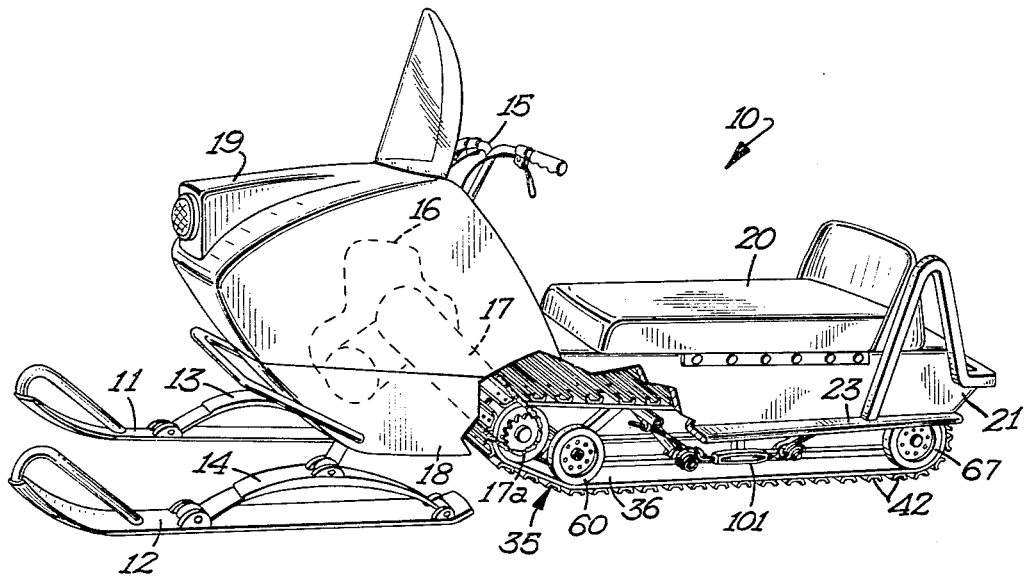
FIG. 1 is an elevational side view of a snowmobile showing a portion of the body housing broken away to expose the tread mechanism.

Referring primarily to FIG. 1, a snowmobile 10 has a pair of front skis 11 and 12 which are secured through a spring suspension system 13 and 14 respectively which is controlled by a pair of handlebars 15. Located in the front of the snowmobile is an engine 16 and a chain drive mechanism 17. Engine 16 and drive mechanism 17 are shown in phantom and are secured to a body frame mechanism 18 and disposed beneath a hood 19 which is hinged at the front thereof and allowed to be "flipped" forwardly to expose the engine and other mechanism under the hood. Engine 16 may be of any general type such as the engines manufactured by the Kohler Corporation or the Onan Company. In this particular disclosure, chain drive mechanism 17 is contained in an oil bath enclosure to provide a constant lubrication.

Figure 3:
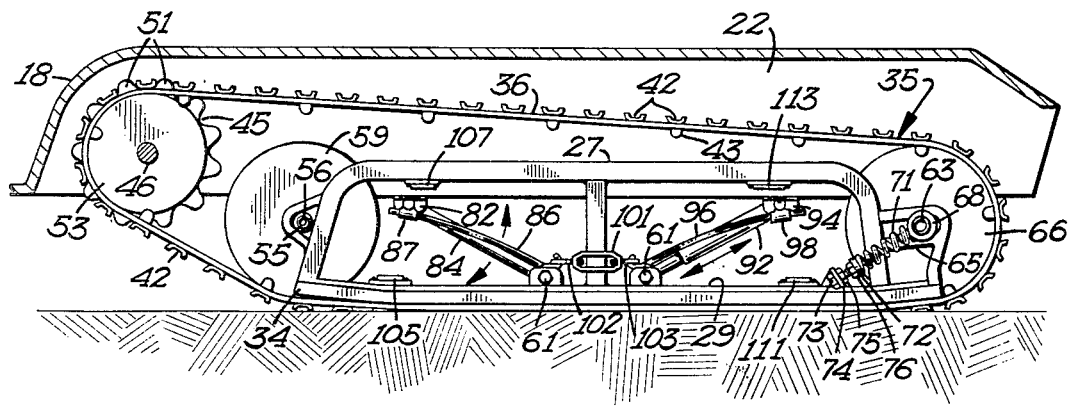
FIG. 3 is a diagrammatic elevational view of the track suspension frame with the outside wheels removed.

Body portion 18 is constructed of an aluminum alloy and is reinforced by suitable framed structures where needed. The rear body portion is in the form of an inverted U cross section and this is shown primarily in FIG. 1 where a cushion 20 is formed across the upper portion of the body frame and a pair of side panels 21 and 22 (FIG. 3) extend downwardly and terminate at the location of a pair of footrests 23 and 24 (FIG. 2).

Figure 2:
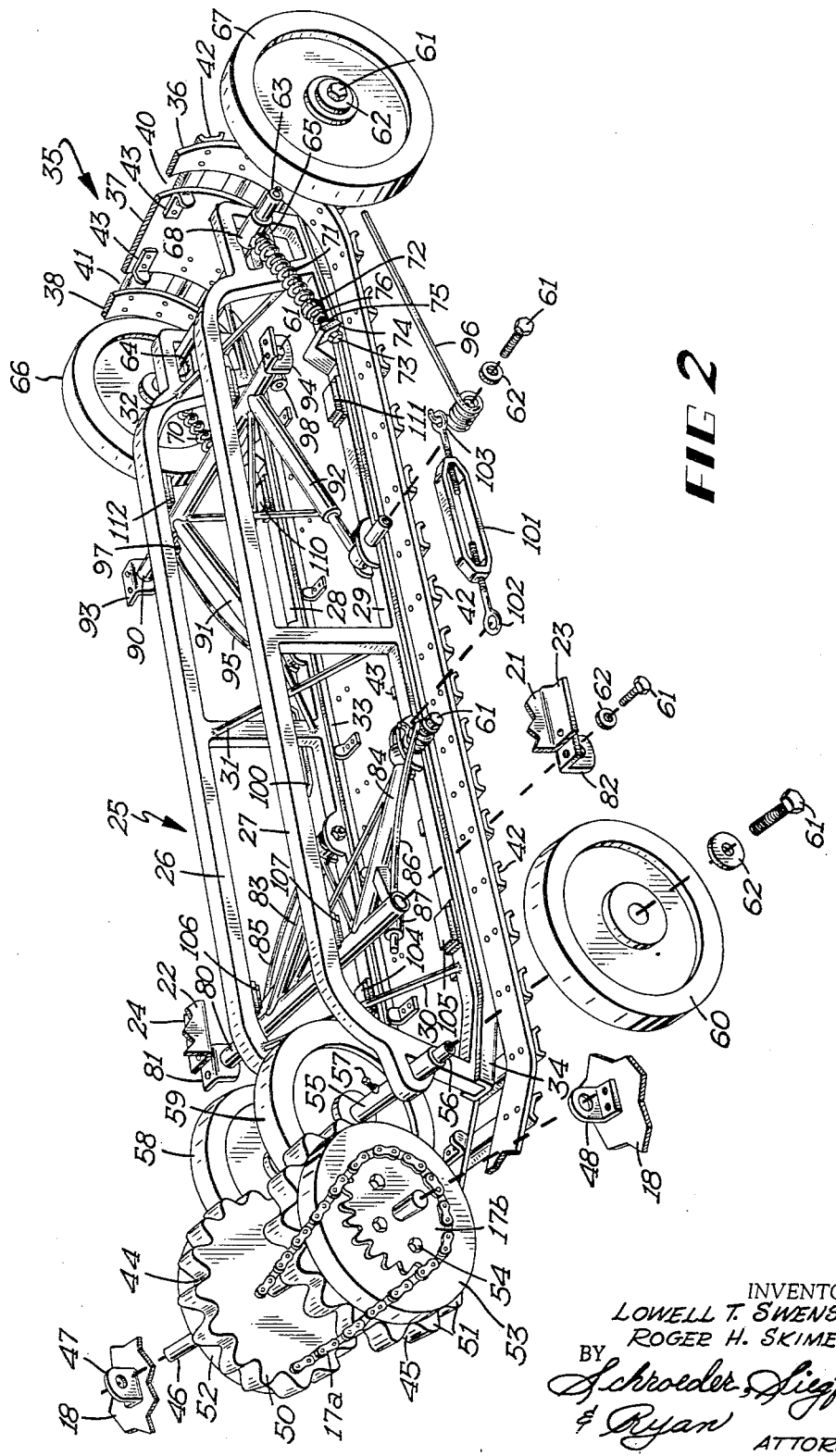
FIG. 2 is a perspective view of the track suspension mechanism showing a portion of the tread broken away.

Referring primarily to FIG. 2, there will be found an elongated thread-supporting frame 25 which is formed of a pair of rectangularly shaped frame sections 26 and 27. Each of the sections 26 and 27 have a pair of center posts formed therein to strengthen the sections. The lower portions of each of the sections form a pair of runners 28 and 29 with the front and rear portions of each of the runners being tilted slightly upwardly in the same manner as that of a sled. Three crossbraces 30 through 32 are secured between frame sections 26 and 27 to form a substantially rigid and box-like arrangement.

Runner portions 28 and 29 of frame sections 26 and 27 respectively have a pair of shoes 33 and 34 secured thereto by suitable means such as screws or machine bolts. The shoes are of U-shaped cross section and fit snugly around the runners 28 and 29.

An endless tread 35 is formed from three flexible belt sections 36, 37, and 38. Belt 37 is centrally located and belts 36 and 38 are of narrower construction, the three being fitted together to provide a pair of elongated slits 40 and 41 which run longitudinally of tread 35. Openings 40 and 41 are of sufficient width to allow shoes 33 and 34 to bear upon a plurality of tread crossbars 42 which are evenly spaced longitudinally along tread 35. The crossbars are shallow channel members formed of heat-treated steel and are secured to belts 36 through 38 by suitable means such as rivets. Crossbars 42 have their flat surfaces drawn over shoes 33 and 34 which offer very little friction to the sliding movement because they are formed of a relatively low-friction polyester resin material, one form of which is known as "Hi-Fax 1900" which is manufactured by the Dayco Corporation, of Three Rivers, Mich. To help alleviate any sidesway of the tread 35, a plurality of guide members 43 are secured on the inside surface of belt section 37 and are formed of right-angle portions so that the depending portions of the guide members engage the sidewalls of shoes 33 and 34. The guide members may be fastened to the tread by a suitable means such as rivets where belt section 37 is secured to crossbars 42.

A pair of sprocket wheels 44 and 45 are secured to a shaft 46 which is journaled in a pair of bearings 47 and 48. Bearings 47 and 48 are secured to a portion of body frame 18 by a suitable means such as bolts or rivets. Sprocket wheels 44 and 45 have a plurality of teeth 50 and 51 respectively which engage crossbars 42 to impart movement to tread 35. Sprocket wheel 44 includes a load-bearing wheel 52 and sprocket wheel 45 includes a load-bearing wheel 53 which support respectively, tread portions 38 and 36 of tread 35. Rotation of shaft 46 is imparted through a chain 17a and a chain sprocket wheel 17b with sprocket wheel 17b being secured to wheel 53 by suitable means such as a plurality of bolts 54.

A pair of bushings (only one of which is shown and is designated reference numeral 55) is secured to the front edge of frame sections 26 and 27 by suitable means such as welding and a shaft 56 is secured in the bushings by suitable means such as a plurality of set screws 57. Three wheels 58, 59, and 60 are supported for rotation by shaft 56, it being understood that wheel 59 is located midway between frame sections 26 and 27 and wheels 58 and 60 are secured to shaft 56 by suitable means such as bolts 61 and washers 62.

At the rear of the tread mechanism, a shaft 63 is supported in a pair of slots 64 and 65 formed in the framework of sections 26 and 27. Secured to shaft 63 are a pair of tread supporting wheels 66 and 67. Wheels 66 and 67 are secured to shaft 63 by appropriate means such as bolts 61 and washers 62. A pair of bushings (only one of which is shown and is designated reference numeral 68) are fitted over shaft 63 and support one end of a pair of springs 70 and 71. The other end of the springs are supported by a pair of collar members (only one of which is shown and is designated reference numeral 72). Collar member 72 extends into spring 71 and is held in place by a bolt 73 which passes through a bracket 74 that is secured to the lower portion or runner portion 29 of frame section 27. Bolt 73 is held in place by a pair of stop nuts 75 and 76. It will of course be understood that spring 70 is secured to runner 28 in the same manner.

A simple lever member 80 is shown in the form of a T-shaped tubular member which has its upper end pivotally secured to a pair of brackets 81 and 82 which are secured respectively to footrests 24 and 23 forming a portion of body frame 18. Brackets 81 and 82 are secured to body frame 18 by a suitable means such as bolts or welding and lever member 80 is secured to brackets 81 and 82 by a suitable means such as machine bolts 61 and washers 62. Lever member 80 has a pair of tubular stem portions 83 and 84 which have pivotal connections at the ends thereof, the connections being made with a pair of upstanding lug members secured to runners 28 and 29 by suitable means such as bolts 61 and washers 62. Secured between the upstanding lug portions of runners 28 and 29, are a pair of spiral springs 85 and 86 which are secured adjacent the outside edges of tubular members 83 and 84 respectively. The upper ends of springs 85 and 86 are held in place by a pair of spring keepers (only one of which is shown and is designated reference numeral 87).

In a similar manner, a rearwardly disposed lever member 90 has a pair of tubular telescoping members 91 and 92 which form the stem portion of the T-shaped lever member. The crossbar portion of the T-shaped member is secured to a pair of brackets 93 and 94 which are secured respectively to the footrests portion 24 and 23 of body 18. The crossbar portion of lever 90 is secured to brackets 93 and 94 by a suitable means such as machine screws 61 and washers 62. The lower portions of telescoping members 91 and 92 are pivotally secured to a pair of lug members formed on runners 28 and 29 by a suitable means such as machine screws 61 and washers 62. The location of the lower pivotal portions of members 84, 85, 91, and 92 is near the center posts reinforcing frame members 26 and 27. A pair of spiral springs 95 and 96 are secured to the lug portions by the bolts 61 and are held in place at the upper end of lever member 90 by a pair of spring keepers 97 and 98. Each of springs 85, 86, 95, and 96 have an upstanding "hook-like" portion which is engaged by a pair of turnbuckle assemblies 100 and 101. Turnbuckle 101 has a pair of eyelet members 102 and 103 that engage springs 86 and 96 respectively and turnbuckle 100 has a pair of like eyelet members for engaging the ends of springs 85 and 95.

Since it will be recognized that as frame 25 moves upwardly and downwardly about the pivot points provided by brackets 81 and 82, lever element 80 could strike the upper or lower portion of the frame and therefore a pair of lower rubber bumpers 104 and 105 are secured respectively to runners 28 and 29 and a pair of upper rubber bumpers 106 and 107 are secured to the upper portion of frame sections 26 and 27. In a similar manner, a pair of rear rubber bumper members 110 and 111 are secured to runners 28 and 29 respectively to engage member 90 and a pair of upper rubber bumpers 112 and 113 are secured to the upper portions of frame sections 26 and 27 to engage member 90.

During the operation of the vehicle, it will be seen that the tread is moved with relative ease over the shoes 33 and 34 and that when a protrusion on the surface is encountered, the frame mechanism 25 is forced upwardly into the recess of body frame 18 and is pivoted about the upper and lower ends of front lever element 80. Because the motion is a rotational motion, as frame 25 moves upwardly and slightly to the rear of the snowmobile, telescoping members 91 and 92 are shortened slightly and the tension is increased on all of the springs. The increased tension causes the frame 25 to be forced downwardly back towards its normal position. Of course some obstructions may produce such a violent impact to tread 35 to cause springs 71 and 70 to be slightly compressed thus allowing the tread a complete freedom of movement while traveling over the terrain. It will also be recognized that the load carried by snowmobile 10 will vary and therefore, turnbuckles 100 and 101 may be turned to compensate for the tension required in springs 85, 86, 95, and 96 to produce a smooth ride without the vehicle "bottoming." However, should frame 25 be abruptly forced upwardly, it will strike the lower rubber bumpers 104, 105, 110 and 111 to help absorb the shock and in like manner, if the snowmobile should go over a hollow area or depression in the terrain, frame 25 will be prevented from moving to an extremely low position with respect to body 18 by the upper bumpers 106, 107, 112, and 113.

In the event one of the spiral springs should break, the spring keepers such as keepers 87, 97, and 98 are used to aid in preventing the spring from falling into the track mechanism and thus jamming the tread or causing a part to be broken.

The frame 25 is generally constructed of some form of aluminum alloy and the entire body structure may be formed of a lightweight metal such as aluminum. The sprocket wheels 44 and 45 are generally formed of a plastic material such as polyurethane.

What is claimed is:

1. A snowmobile tread drive and suspension system comprising:
    (a) a body frame having substantially a rectangular shaped opening, open at the rear thereof with surface engaging runners disposed to support substantially the forward portion of said body frame, the front portion thereof having a motor mechanism secured thereto;

(b) an elongated tread supporting frame having a pair of runners and constructed and arranged to move within said opening of said body frame;

(c) a pair of connecting lever members having transversely spaced pivotal means at each end thereof, one of said lever members having extensibly movable elements and the other being rigidly formed, said lever members pivotally connecting said tread supporting frame at spatially disposed locations in substantially the central portion thereof and pivotally connecting said body frame at spatially disposed locations adjacent the front and rear portions of said tread supporting frame;

(d) a pair of spring bias mechanisms operably engaging said tread supporting frame and said body frame urging said frames away from each other;

(e) a first and second plurality of wheels secured to the front and rear portions respectively of said tread supporting frame for rotation with respect thereto, said wheels having their axes of rotation transversely aligned with said elongated frame;

(f) an endless flexible tread encompassing and being urged into operative engagement with said first and second plurality of wheels and said tread supporting frame by said spring bias mechanisms, said tread, said plurality of wheels, and said tread supporting frame moving towards and into said body frame opening as a unit upon said pair of spring bias mechanisms being intermittently overcome by an opposite force, said tread providing sole support to the rear portion of the snowmobile;

(g) a driving mechanism operatively engaging said flexible tread and said motor mechanism for imparting motion to said flexible tread; and (h) a pair of spring retainer mechanisms engaging said pair of spring bias mechanisms, said retainer mechanisms having movable members therein for changing the tension on said spring bias mechanisms.

2. The invention as set forth in claim 1 including:
a spring biased tension setting mechanism operably engaging at least one of said first and second plurality of wheels and said tread supporting frame, said tension setting mechanism urging said plurality of wheels away from said tread supporting frame and causing said tread to be taut.

3. The invention as set forth in claim 1 including:
at least a pair of resilient bumpers secured to said runners and disposed to engage and arrest the movement of said pair of connecting lever members when said runners are forced towards and into said body frame opening.

4. The invention as set forth in claim 1 including:
a pair of shoe members secured to said tread runners between said runners and said tread, said shoe members having a substantially low coefficient of friction.

5. The invention as set forth in claim 4 including:
a plurality of crossbars secured on the outside of said tread, and having a pair of slits in said tread running the length thereof cooperatively receiving said pair of shoe members for sliding engagement with said crossbars.

6. The invention as set forth in claim 5 including:
a plurality of guide members secured on the inside of said tread and transversely disposed thereon between said pair of shoe members for intermittent engagement therewith to limit sidesway of said tread.

7. A snowmobile tread drive and suspension system comprising:
(a) body means having substantially a rectangular shaped opening therein with a motor mechanism secured thereto;

(b) elongated tread supporting means having a pair of upstanding rectangularly shaped members secured to each other in spaced and confronting relationship, the lower portions of said members forming a pair of runners, said tread supporting means constructed and arranged to move within said opening of said body means;

(c) first connecting lever means having a fixed length and pivotal means at each end thereof connecting said body means at a front portion thereof, to said tread supporting means at a first lower midportion thereof;

(d) second connecting lever means having a pivotal means at each end thereof connecting said body means at a rear portion thereof to said tread supporting means at a second lower midportion thereof spatially disposed from said first lower midportion, said second connecting bracket means having extensibly movable elements;

(e) first spring bias means operably engaging said tread supporting means and said first lever means, and cooperating with said body means to urge said tread supporting means and said first lever means, from each other;

(f) second spring bias means operably engaging said tread supporting means and said second lever means, and cooperating with said body means to urge said tread supporting means and said body means away from each other;

(g) spring bias connecting means interconnecting said first and second spring bias means whereby bias changes in one of said bias means produces similar changes in the other of said bias means, said connecting means including means for varying the magnitude of said bias changes;

(h) a first plurality of wheel means secured to the front portion of said tread supporting means for rotation with respect thereto, said first wheel means having their axes of rotation transversely aligned with said elongated tread supporting means;

(i) a second plurality of wheel means secured to the rear portion of said tread supporting means for rotation with respect thereto, said second wheel means having their axes of rotation transversely aligned with said elongated tread supporting means;

(j) endless tread means encompassing and being urged into operative engagement with said first and second plurality of wheel means and said tread supporting means by said first and second spring bias means, said tread means, plurality of first and second wheel means and tread supporting means moving towards, and into said opening of said body means as a unit upon said first and second spring bias means being intermittently overcome by an opposite force;

(k) and driving means independent of said first and second plurality of wheels operatively engaging said tread means and said motor mechanism for imparting motion to said tread means.

8. The invention as set forth in claim 7 including:
(l) guide means secured to the rear of said tread supporting means having rearwardly extending slot portions for securing the axes of said second plurality of wheel means therein allowing movement substantially towards or away from said front portion of said tread supporting means;

(m) and third spring bias means operably engaging said second plurality of wheel means and cooperating with said tread supporting means and said guide means to urge said second plurality of wheel means away from said front portion of said tread supporting means.

9. The invention as set forth in claim 7 wherein said first plurality of wheel means include:
(n) at least a pair of wheels secured to said front portion of said tread supporting means at the outside edges thereof to support the edges of said endless tread means and at least one wheel transversely secured therebetween to support the center of said endless tread means.

10. The invention as set forth in claim 7 wherein said first and second spring bias means include:
   (o) spiral spring means secured about said pivotal means of said first and second connecting lever means where connected to said tread supporting means, said spring bias connecting means connecting one end of each of said spiral spring means, the other ends of said spiral spring means operably engaging said connecting lever means to hold said spiral spring means under tension.

11. The invention as set forth in claim 10 including:
   (p) spring keepers secured to each of said connecting lever means cooperatively engaging said spiral spring means and allowing said spiral spring means to slide therein during rotational movement of said connecting lever means.

12. A snowmobile tread drive and suspension comprising:
   (a) an elongated body frame having an opening therein of substantially an inverted U cross section formed at the rear thereof, and including surface engaging runners disposed to support substantially the forward portion of said body frame, the front portion thereof having a motor mechanism secured thereto;
   (b) an elongated tread supporting frame having a pair of runners and constructed and arranged to move beneath and within said opening of said body frame;
   (c) at least a pair of connecting lever members having transversely spaced pivotal means at each end thereof pivotally connecting said body frame to said tread supporting frame adjacent the front and rear portions thereof, one of said lever members having elements movable with respect to said tread supporting frame;
   (d) at least a pair of spring bias mechanisms operably engaging said connection lever members and urging said tread supporting frame and said body frame away from each other;
   (e) at least a pair of wheels having their axes of rotation transversely aligned with said elongated tread supporting frame and being movable with respect to said body frame;
   (f) a tread driving mechanism including a plurality of tread driving sprockets rotatably secured to said body frame and operatively engaging said motor mechanism for imparting motion to a flexible tread;
   (g) and an endless flexible tread moving within said body frame opening providing sole surface support to the rear portion of the snowmobile, said flexible tread encompassing and engaging said pair of wheels, said plurality of tread driving sprockets and said runners of said tread supporting frame.

13. A snowmobile tread drive and suspension system comprising:
   (a) a body means having an opening therein of substantially an inverted U cross section formed at the rear thereof and including surface engaging means disposed to support substantially the forward portion of said body means, the front portion thereof having a motor mechanism secured thereto;
   (b) elongated tread supporting means having a pair of members forming a pair of runners, said tread supporting means constructed and arranged to move beneath and within said opening of said body means;
   (c) first lever means having a fixed length and pivotal means at each end thereof connecting said body means to said tread supporting means and facilitating arcuate movement thereof;
   (d) second lever means having pivotal means at each end thereof operably engaging said body means and said tread supporting means, said second lever means including means movable with respect to said tread supporting means;
   (e) spring bias means operably engaging and urging said tread supporting means and said body means away from each other;
   (f) a plurality of wheel means having their axes of rotation transversely aligned with said elongated tread supporting means and being movable with respect to said body means;
   (g) endless tread means providing sole support to the rear portion of the snowmobile encompassing and engaging said plurality of wheel means and said runners of said tread supporting means and moving within said opening of said body means;
   (h) and tread driving means including sprocket means operatively engaging said tread means and secured to said body means independent of said plurality of wheel means, said sprocket means operatively engaging said motor mechanism for imparting motion to said tread means.

14. The invention as set forth in claim 13 including:
   (i) another plurality of wheel means having their axes of rotation transversely aligned with said elongated tread supporting means and secured to the front portion of said tread supporting means.

15. In a tread drive and suspension system for a snowmobile having a body frame with a motor mechanism and skis secured to the front thereof and having an elongated opening in the body frame adapted to operatively receive an endless flexible tread means forming the sole surface support for the rear portion of the snowmobile, comprising in combination:
   (a) tread driving means including sprocket wheel means and idler wheel means, at least one of said wheel means being rotatably secured to said body frame adjacent the opening therein, said sprocket wheel means being drivingly connected to said motor mechanism;
   (b) tread supporting means disposed longitudinally along the lower run of said tread means between said sprocket wheel means and said idler wheel means, and being movable independently of said sprocket wheel means, said tread supporting means including runner means adapted for vertical movement within the confines of said endless tread means and within the opening of said body frame;
   (c) longitudinally spaced connecting means connecting said body means to said tread supporting means permitting said movement of said tread supporting means, at least one of said connecting means including a pivotal connection;
   (d) bias means operably connected between said tread supporting means and said body frame and urging said runner means into engagement with said endless tread means; and
   (e) said endless flexible tread means moving within the opening of said body frame and encompassing and engaging said sprocket wheel means, said idler wheel means and said tread supporting means.

16. The structure as set forth in claim 15 including:
   (f) tension controlling means for controlling the tension of said endless tread means connected to said idler wheel means and being movable longitudinally with respect to said body frame.

17. The structure set forth in claim 15 including:
   (g) at least a plurality of wheel means having their axes of rotation transversely aligned with said tread supporting means and secured to the front portion of said tread supporting means.

18. The structure set forth in claim 15 including:
   (h) shoe members secured to said runner means between said tread means and said means, said shoe members having a substantially low coefficient of friction;
   (i) a plurality of metal shoe riding elements secured to said tread means at longitudinally spaced intervals and adapted to slidingly engage said shoe members.

19. In a snowmobile tread drive and suspension system having a body frame with a motor mechanism and skis secured to the front thereof and having an elongated opening in the body frame adapted to operatively receive an endless flexible tread forming the sole surface support for the rear portion of the snowmobile in which a tread drive including driving wheels and idler wheels has at least the driving wheels rotatably secured to the body frame adjacent the opening therein with the driving wheels drivingly connected to the motor mechanism, comprising in combination:

(a) endless tread means constructed and arranged to move within the opening of the body frame and encompassing and engaging the driving and idler wheels;

(b) tread supporting means including a pair of runners, said tread supporting means disposed longitudinally between the driving and idler wheels and adapted to move within the confines of said endless tread means;

(c) at least a pair of longitudinally spaced connecting lever means having pivotal means pivotally connecting the body frame to said tread supporting means while in operable engagement with said endless tread means and when caused to move away therefrom, at least one of said lever means having an element capable of relative movement with respect to said tread supporting means;

(d) bias means operably engaging said tread supporting means and urging said tread supporting means away from the body frame;

(e) and tension controlling means for controlling the tension of said endless tread means at least when said tread supporting means is urged towards disengagement from said endless tread means.

References Cited

UNITED STATES PATENTS

| 1,488,629 | 4/1924 | Wick | 305—31 |
| 2,284,075 | 5/1942 | Tucker | 180—5 |
| 2,339,886 | 1/1944 | Shannon | 180—5 |
| 3,023,824 | 3/1962 | Bombardier | 180—5 X |
| 3,175,633 | 3/1965 | Goulet | 180—5 |

RICHARD J. JOHNSON, Primary Examiner

U.S. Cl. X.R.

305—24

UNITED STATES PATENT OFFICE
CERTIFICATE OF CORRECTION

Patent No. 3,485,312               Dated   December 23, 1969

Inventor(s)  Lowell T. Swenson & Roger H. Skime

It is certified that error appears in the above-identified patent and that said Letters Patent are hereby corrected as shown below:

Claim 7, Line 23, after "said" delete "first lever means" and substitute therefor -- body means away--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents